United States Patent
He et al.

(10) Patent No.: US 8,422,368 B2
(45) Date of Patent: Apr. 16, 2013

(54) CALL ADMISSION CONTROL METHOD

(75) Inventors: Jiaming He, Ningbo (CN); Fudong Feng, Ningbo (CN); Qingbo Zhang, Ningbo (CN); Dexiang Jia, Ningbo (CN); Yan Li, Ningbo (CN); Zhihui Shi, Ningbo (CN); Linghui Fan, Ningbo (CN)

(73) Assignees: Ninbo University, Ningbo, Zhejiang Province (CN); NINGBO SUNRUN ELEC.&INFO.ST&D Co., Ltd, Ningbo, Zhejiang Province (CN)

( * ) Notice: Subject to any disclaimer, the term of this patent is extended or adjusted under 35 U.S.C. 154(b) by 281 days.

(21) Appl. No.: 12/855,320

(22) Filed: Aug. 12, 2010

(65) Prior Publication Data

US 2012/0039168 A1 Feb. 16, 2012

(51) Int. Cl.
*G06F 11/00* (2006.01)

(52) U.S. Cl.
USPC ........................................................ 370/230

(58) Field of Classification Search ........... 370/230–234
See application file for complete search history.

(56) References Cited

U.S. PATENT DOCUMENTS 6,707,790 B1 *  3/2004  Wu et al. ...................... 370/230
2003/0069973 A1 *  4/2003  Ganesan et al. .............. 709/226

* cited by examiner

*Primary Examiner* — Luat Phung

(57) ABSTRACT

A call admission control method can ensure the admission rate of the high priority business, and simultaneously greatly improve the admission rate of the low priority business. The occupied bandwidth of currently admitted business flows of a WiMAX network is denoted by $\Sigma b_{i,max}$, a bandwidth threshold of a base station system is denoted by $b_{th}$, a total bandwidth that the base station system can distribute to users is denoted by $b_{total}$, applied minimum and maximum bandwidths are denoted by $b_{N+1,min}, b_{N+1,max}$, respectively for a new arrival (N+1)th business flow. When $\Sigma b_{i,max} + b_{N+1,max} \leq b_{th}$, the base station system will directly admit a request of an (N+1)th business flow. When $\Sigma b_{i,min} + b_{N+1,min} > b_{total}$, the base station system will directly refuse the request of the (N+1)th business flow. When $\Sigma b_{i,max} + b_{N+1,max} \geq b_{th}$ and $\Sigma b_{i,min} + b_{N+1,min} \leq b_{total}$, comparing an admission rate P with a random number $\alpha$ to determine whether a new arrival (N+1)th business flow is admitted or not.

1 Claim, 4 Drawing Sheets

CALL ADMISSION CONTROL METHOD

BACKGROUND OF THE PRESENT INVENTION

1. Field of Invention

The present invention relates to a wireless broadband technology, and more particularly to a call admission control method.

2. Description of Related Arts

WiMAX (World Interoperability for Microwave Access) is a wireless metropolitan area network technology, and a new proposed air interface standard for the microwave and millimeter-wave frequency band. Compared with the other technologies, WiMAX can be applied to the barrier-free, long-distance (several kilometers) and large-capacity (10M) wireless data transmission, the large-capacity data acquisition and the long-distance wireless broadband transmission for field operations, the real-time audio and video capture for the emergency system deployment of earthquakes, forest fire prevention, floods and emergencies, and the "last mile" wireless broadband access for wireless broadband remote transmission equipments, homes and businesses. Therefore, WiMAX has a huge market demand.

In WiMAX wireless broadband networks, call admission control (CAC) is the key to ensure the quality of service (QoS), and plays an important role in reducing network congestion and improving utilization ratio of network resources.

Nowadays, many call admission control methods have been proposed, in which a more typical control method is the guard channel strategy.

In the guard channel strategy, the base station system has always reserved a maximum bandwidth for every business flow till the service period of the business flow ends. Also, the bandwidth threshold of the base station system is set, when the total reserved bandwidth of the base station system exceeds the bandwidth threshold, the base station system will refuse to admit the low priority business and only admit the high priority business. Accordingly, the characteristics of the guard channel strategy are improving the rejection rate of the low priority business and reducing the utilization rate of the base station system resources so as to reduce the rejection rate of the high priority business, thus ensuring the quality of service of the high priority business. The biggest drawback of the existing guard channel strategy is explained as follows. The bandwidth reserved by the base station system for the admitted business flow can not be fully used in the traffic real-time changes. If admitting a new business flow damages the quality of service of the admitted business flow, in spite that whether the normal communication of the admitted business flow is affected or not, the new business flow will be not admitted. Simultaneously, the guard channel strategy limits the admission rate of the low priority business at a very low level, so it lacks fairness for various user demands with different priorities.

SUMMARY OF THE PRESENT INVENTION

An object of the present invention is to provide a call admission control method, which is capable of greatly improving the utilization rate of the bandwidth, ensuring the admission rate of the high priority business, and simultaneously greatly improving the admission rate of the low priority business.

Accordingly, in order to accomplish the above object, the present invention provides a call admission control method, wherein the number of currently admitted business flows of a WiMAX network is denoted by N, a sum of reserved maximum bandwidths with which a base station system provides the admitted business flows is denoted by $\Sigma b_{i,max}$, applied minimum and maximum bandwidths are denoted by $b_{N+1,min}$, $b_{N+1,max}$, respectively for a new arrival (N+1)th business flow, a bandwidth threshold of the base station system is denoted by $b_{th}$, and a total bandwidth that the base station system is capable of distributing to users is denoted by $b_{total}$, the method comprising the steps of:

(A) if $\Sigma b_{i,max} + b_{N+1,max} \leq b_{th}$, namely, base station system resources are idle, directly admitting a request of an (N+1)th business flow by the base station system;

(B) if $\Sigma b_{i,min} + b_{N+1,min} > b_{total}$, namely, base station system resources are seriously insufficient, directly refusing the request of the (N+1)th business flow by the base station system; and (C) if $\Sigma b_{i,max} + b_{N+1,max} \geq b_{th}$ and $\Sigma b_{i,min} + b_{N+1,min} \leq b_{total}$, namely, base station system resources are constrained, performing the following steps by the base station system of:

(C1) firstly, if $b_{th} \leq \Sigma b_{i,max} + b_{N+1} \leq b_{total}$, non-degrading bandwidths of the currently admitted business flows of the WiMAX network by the base station system; if $\Sigma b_{i,max} + b_{N+1,max} \geq b_{total}$, degrading bandwidths of the currently admitted business flows of the WiMAX network to reserved maximum bandwidths of the currently admitted business flows by the base station system, respectively;

(C2) then, if the base station system refuses the (N+1)th business flow, obtaining a Gini coefficient, denoted by $G_{ongoing}$, by the base station system, where $G_{ongoing}$ is an obtained Gini coefficient when the base station system admits the N-th business flow; if the base station system admits the (N+1)th business flow, obtaining another Gini coefficient, denoted by $G_{new}$, by the base station system, wherein $G_{ongoing}$ and $G_{new}$ can be determined by a following expression of $$G = \frac{2\mathrm{cov}(x_k, k)}{n\mu},$$

where $\mu$ is an average income of the admitted business flows, n is the number of the business flows admitted by the base station system, $x_k$ is an income of each of the business flows and the income relationship among the admitted business flows is arranged as $x_1 \leq x_2 \leq \ldots \leq x_n$, $\mathrm{cov}(x_k,k)$ is a covariance of $x_k$ and k, wherein while computing $G_{ongoing}$, k is in the range of [1, N], n is N, while computing $G_{new}$, k is in the range of [1,N+1], n is N+1, wherein $x_k$ is determined by a following expression of $x_k = w_k b_k$, where $w_k$ is a weight of every business flow determined by an expression of $w_k = e^{p_k}$, $b_k$ is a bandwidth of every business flow, and $p_k$ is a priority of every business flow.

(C3) then, comparing a relationship among $G_{ongoing}$, $G_{new}$ and an fair threshold and determining an admission rate by the base station system, where the admission rate is denoted by P, the fair threshold is denoted by $G_{th}$ in the range from 0 to 1, wherein if $G_{ongoing} > G_{th}$, then P is $P_1$ determined by a following expression based on Sigmoid function of $$P_1 = \begin{cases} 1 & G_{new} < G_{th} < G_{ongoing} \\ \dfrac{1}{1 + e^{(-a(G_{ongoing} - G_{new})/(G_{ongoing} - G_{th}) + b)}} & G_{th} \leq G_{new} \leq G_{ongoing} \\ 0 & G_{th} < G_{ongoing} < G_{new}; \end{cases}$$

if $G_{ongoing} \leq G_{th}$, then P is $P_2$ determined by a following expression based on Sigmoid function of $$P_2 = \begin{cases} 1 & G_{new} \leq G_{ongoing} \leq G_{th} \\ \dfrac{1}{1+e^{(a(G_{new}-G_{ongoing})/(G_{th}-G_{ongoing})-b)}} & G_{ongoing} < G_{new} \leq G_{th} \\ 0 & G_{ongoing} \leq G_{th} < G_{new}, \end{cases}$$

where a,b are coefficients of the expression, and make $P_1$ (while $G_{th} \leq G_{new} \leq G_{ongoing}$) always larger than $P_2$ (while $G_{ongoing} < G_{new} \leq G_{th}$); and (C4) after determining P by the base station system, generating a random number between 0 and 1 by the random number generator obeying uniform distribution, denoted by α, by the base station system, and choosing a bigger one by comparing P with 1−P, and forming cumulative probability intervals of [0, max(P,1−P)] and [(max(P,1−P),1] together with 0 and 1, wherein when α∈[0,max(P,1−P)], if max(P,1−P)=P, then the request of the (N+1)th business flow will be admitted; if max(P,1−P)=1−P, then the request of the (N+1)th business flow will be refused; when α∈(max(P,1−P),1], if max(P,1−P)=P, then the request of the (N+1)th business flow will be refused, if max(P,1−P)=1−P, then the request of the (N+1)th business flow will be admitted.

Compared with the prior art, the present invention has some advantages as follows. In the present invention, the fair threshold, the Gini coefficient and the admission rate are set, deciding whether a new business flow is admitted or not by judging the admission rate. Furthermore, the result from the simulation test to the above mentioned technical program by using the Matlab software platform shows, compared with the prior art, the call admission control method of the present invention can greatly improve the utilization rate of the bandwidth, ensure the admission rate of the high priority business, and simultaneously greatly improve the admission rate of the low priority business.

These and other objectives, features, and advantages of the present invention will become apparent from the following detailed description, the accompanying drawings, and the appended claims.

DETAILED DESCRIPTION OF THE PREFERRED EMBODIMENT

Figure 1:
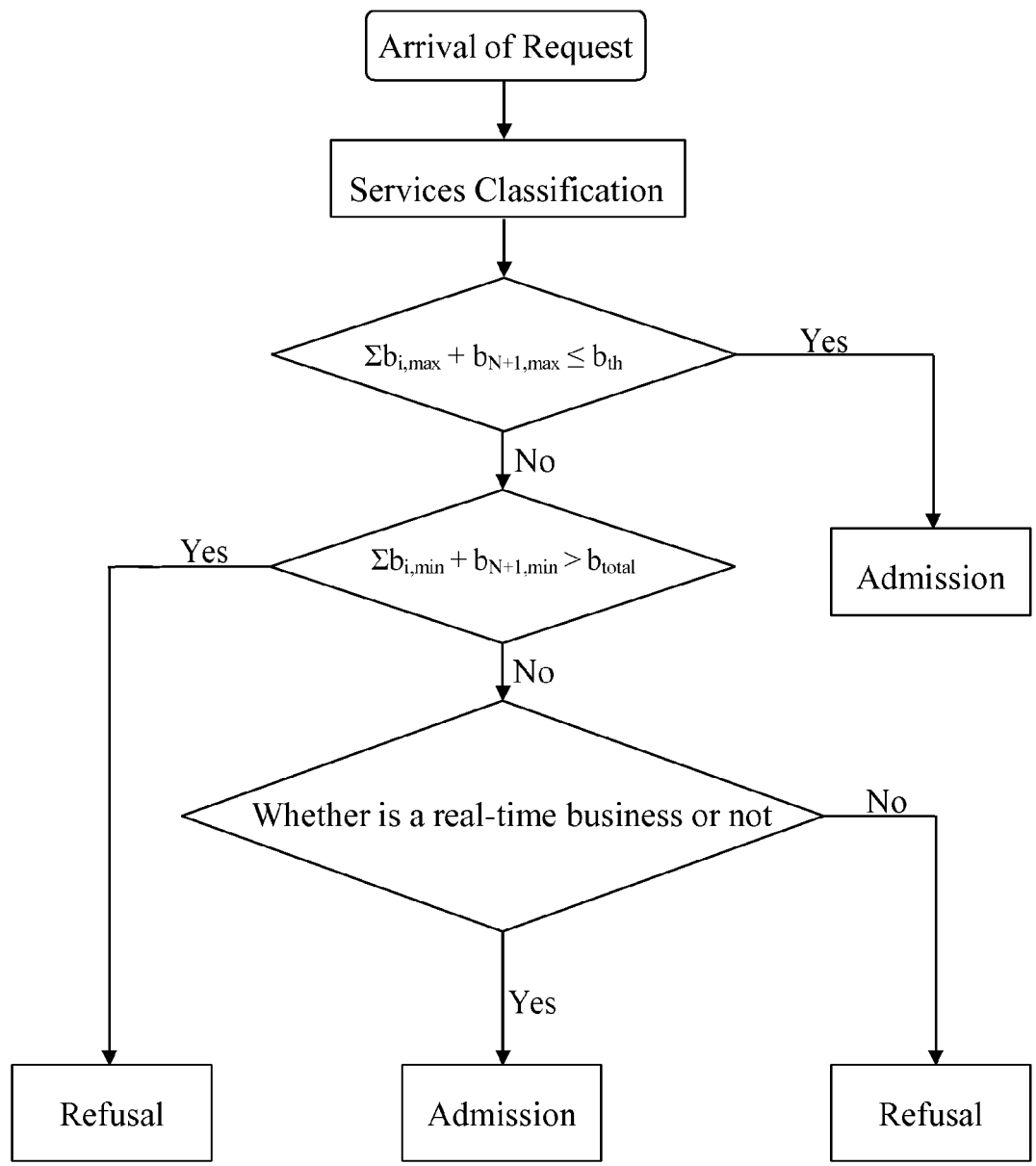
FIG. 1 is a control flowchart of an existing call admission control method using a guard channel strategy.

The present invention is further detailedly explained with the accompanying drawings and preferred embodiment.

IEEE 802.16 of the WiMAX system regulates four types of quality of service (QoS) of the business flow, namely, UGS, rtPS, nrtPS and BE. While establishing the business flow, the minimum and the maximum bandwidths of the flow transmission are determined at the initiated terminal. The actually obtained bandwidth after admitting the business flow is between the minimum bandwidth and the maximum bandwidth. Moreover, the actually obtained bandwidth of the business flow can be regulated by the bandwidth allocation strategy.

In the call admission control method of the present invention, the number of the currently admitted business flows of the WiMAX network is denoted by N. The sum of the reserved maximum bandwidths with which the base station system provides the admitted business flows is denoted by $\Sigma b_{i,max}$. For the new arrival (N+1)th business flow, the applied minimum and maximum bandwidth are denoted by $b_{N+1,min}$, $b_{N+1,max}$, respectively. The bandwidth threshold of the base station system is denoted by $b_{th}$. The total bandwidth that the base station system can distribute to users is denoted by $b_{total}$.

When $\Sigma b_{i,max} + b_{N+1,max} \leq b_{th}$, namely, the base station system resources are idle, the base station system will directly admit the request of the (N+1)th business flow.

When $\Sigma b_{i,min} + b_{N+1,min} > b_{total}$, namely, the base station system resources are seriously insufficient, the base station system will directly refuse the request of the (N+1)th business flow.

When $\Sigma b_{i,max} + b_{N+1,max} \geq b_{th}$ and $\Sigma b_{i,min} + b_{N+1,min} \leq b_{total}$, namely, the base station system resources are constrained, the base station system will perform the following steps.

Firstly, if $b_{th} \leq \Sigma b_{i,max} + b_{N+1,max} \leq b_{total}$, then the base station system will not reduce, namely, maintain the bandwidths of the currently admitted business flows of the WiMAX network; if $\Sigma b_{i,max} + b_{N+1,max} \geq b_{total}$, then the base station system will reduce the bandwidths of the currently admitted business flows of the WiMAX network to reserved maximum bandwidths of the currently admitted business flows, respectively.

Then, if the base station system refuses the (N+1)th business flow, then the base station system will obtain a Gini coefficient which is denoted by $G_{ongoing}$, where $G_{ongoing}$ is an obtained Gini coefficient when the base station system admits the N th business flow; if the base station system admits the (N+1)th business flow, then the base station system will obtain another Gini coefficient which is denote by $G_{new}$. $G_{ongoing}$ and $G_{new}$ can be determined by the following expression of $$G = \frac{2\text{cov}(x_k, k)}{n\mu},$$

where μ is an average income of the admitted business flows, n is the number of the business flows admitted by the base station system, $x_k$ is an amount of incoming traffic of every business flow and the income relationship among the admitted business flows is arranged as $x_1 \leq x_2 \leq \ldots \leq x_n$, $cov(x_k,k)$ is a covariance of $x_k$ and k. While computing $G_{ongoing}$, k is in the range of [1,N], n is N. While computing $G_{new}$, k is in the range of [1,N+1], n is N+1.

$x_k$ is determined by the following expression of $x_k=w_k b_k$, where $w_k$ is a weight of every business flow determined by the expression of $w_k=e^{p_k}$, $b_k$ is a bandwidth of every business flow, and $p_k$ is a priority of every business flow.

Then, the base station system compares a relationship among $G_{ongoing}$, $G_{new}$ and the fair threshold and determines the admission rate, wherein the admission rate is denoted by P, the fair threshold is denoted by $G_{th}$ which is in the range from 0 to 1.

If $G_{ongoing} > G_{th}$ then P is $P_1$ which is determined by the following expression based on Sigmoid function of $$P_1 = \begin{cases} 1 & G_{new} < G_{th} < G_{ongoing} \\ \dfrac{1}{1+e^{(-a(G_{ongoing}-G_{new})/(G_{ongoing}-G_{th})+b)}} & G_{th} \leq G_{new} \leq G_{ongoing} \\ 0 & G_{th} < G_{ongoing} < G_{new}; \end{cases}$$

if $G_{ongoing} \leq G_{th}$, then P is $P_2$ which is determined by the following expression based on Sigmoid function of $$P_2 = \begin{cases} 1 & G_{new} \leq G_{ongoing} \leq G_{th} \\ \dfrac{1}{1+e^{(a(G_{new}-G_{ongoing})/(G_{th}-G_{ongoing})-b)}} & G_{ongoing} < G_{new} \leq G_{th} \\ 0 & G_{ongoing} \leq G_{th} < G_{new}, \end{cases}$$

wherein a,b are coefficients of the expression, and make $P_1$ (while $G_{th} \leq G_{new} \leq G_{ongoing}$) always larger than $P_2$ (while $G_{ongoing} < G_{new} \leq G_{th}$), that is to say, while $G_{ongoing} > G_{th}$, the base station system has been in a state of unfair income distribution, the new business capable of reducing unfairness should be admitted at a high rate, while $G_{ongoing} \leq G_{th}$, the base station system has been in a state of relatively fair income distribution, the new arrived business capable of destroying current fairness should be admitted at a rate smaller than the former condition.

When the base station system determines P, the base station system will generate a random number, denoted by α, between 0 and 1 by the random number generator obeying uniform distribution. The base station system firstly compares P with 1−P, and chooses the bigger one, and then forms the cumulative probability intervals of [0, max(P,1−P)] and [(max(P,1−P),1] together with 0 and 1. When α∈[0, max(P,1−P)], if max(P,1−P)=P, then the request of the (N+1)th business flow will be admitted; if max(P,1−P)=1−P, then the request of the (N+1)th business flow will be refused. When α∈(max(P,1−P),1], if max(P,1−P)=P, then the request of the (N+1)th business flow will be refused; if max(P,1−P)=1−P, then the request of the (N+1)th business flow will be admitted.

FIG. 1 is a control flowchart of an existing call admission control method using a guard channel strategy.

Figure 2:
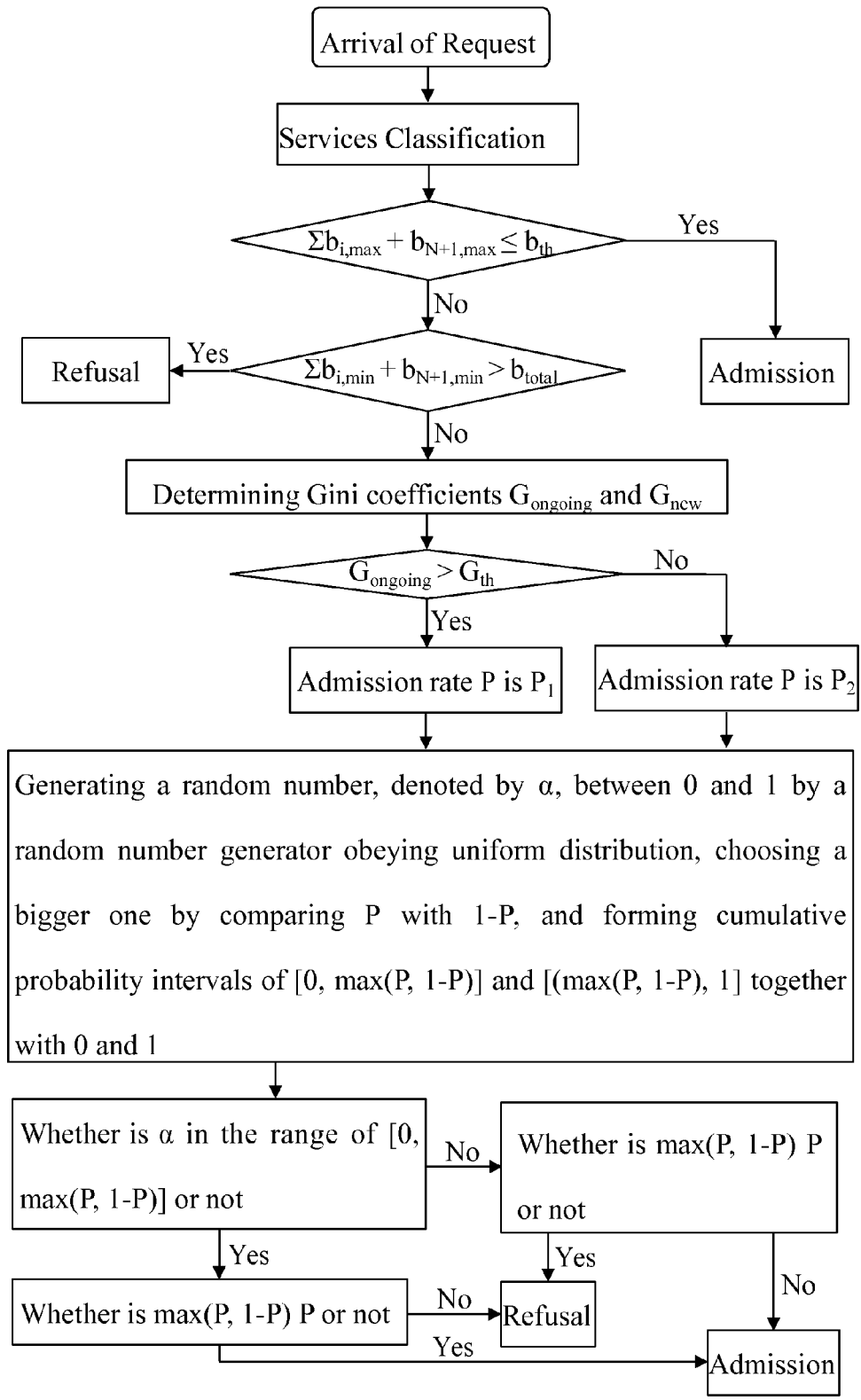
FIG. 2 is a control flowchart of a call admission control method according to a preferred embodiment of the present invention.

FIG. 2 is a control flowchart of a call admission control method according to a preferred embodiment of the present invention.

The fair threshold can be taken any value between 0 and 1 in advance, and then during the debugging process of the base station system, the fair threshold will be increased or decreased based on the pre-taken value to determine the optimal fair threshold of every base station system.

The $b_i$ is determined by the bandwidth allocation strategy of the base station system. The present invention adopts the uniform allocation strategy.

To verify the validity of the call admission control method of the present invention, Matlab is selected as a simulation tool. In accordance with the QoS setting of 802.16 protocol, simulating a slave station (SS) connected to a base station (BS), the SS generates UGS, rtPS and nrtPS businesses, its priority is p={5, 4, 3} and generated by the Poisson distribution with a mean of λ={2, 2, 16}/s. The service time of every business obeys the exponential distribution with a mean of 1/μ=5 s, the maximum bandwidth b={0.2, 0.25, 0.6} Mbit/s, the minimum bandwidth $b_{min}=\delta b_{max}$, wherein δ={1, 0.8, 0.5}. The total bandwidth of the system $b_{total}$ is 180 Mbit/s, the bandwidth threshold $b_{th}=0.8 b_{total}$, the fair threshold $G_{th}=0.35$, the simulation time is 30 s. In the expression of the admission rate, taking a=6, b=0.23, the system adopts the uniform bandwidth allocation strategy to the admitted business flows. When the bandwidth degradation occurs, the method of decreasing the maximum bandwidth of the admitted business flow, as a prior art, is used.

By adjusting the arrival rate λ of the business with the same proportion, judging the resource tension of the system on the basis of the proportion. While simulation, compared a typical strategy of the guard channel strategy, cutoff priority algorithm, hereinafter abbreviated to CP algorithm, with an equitable distribution of income algorithm of a call admission control method according to the present invention, hereinafter abbreviated to EDI algorithm.

Figure 3:
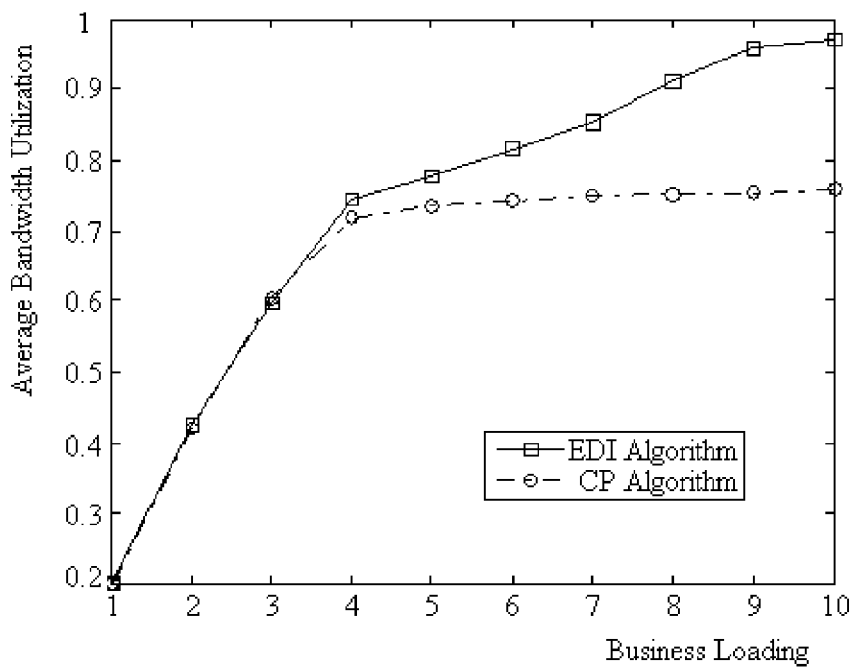
FIG. 3 is a first comparison chart showing the results of the simulation test to the call admission control method according to the above preferred embodiment of the present invention and the existing call admission control method using a guard channel strategy.

Referring to FIG. 3, the average bandwidth utilization ratio of the EDI algorithm is larger than the bandwidth utilization ratio of the CP algorithm from the load 3. Moreover, with the increase of the load, the bandwidth utilization ratio of the CP algorithm will slowly increase, while the bandwidth utilization ratio of the EDI algorithm will be close to 100%. This is because the CP algorithm is always in accordance with the requirements of the maximum bandwidth to control the admission and reserve the bandwidth, and no bandwidth degradation exists. Therefore, the bandwidth is wasted seriously. However, according to the current resource situation, the EDI algorithm begins to reserve a very large bandwidth for every business, and then gradually decreases the bandwidth to admit more business flows, and lastly the bandwidth of every business flow is close to the requirement of the minimum bandwidth. Therefore, the bandwidth utilization ratio of the EPI algorithm is higher than that of the CP algorithm with the increase of the load.

Figure 4:
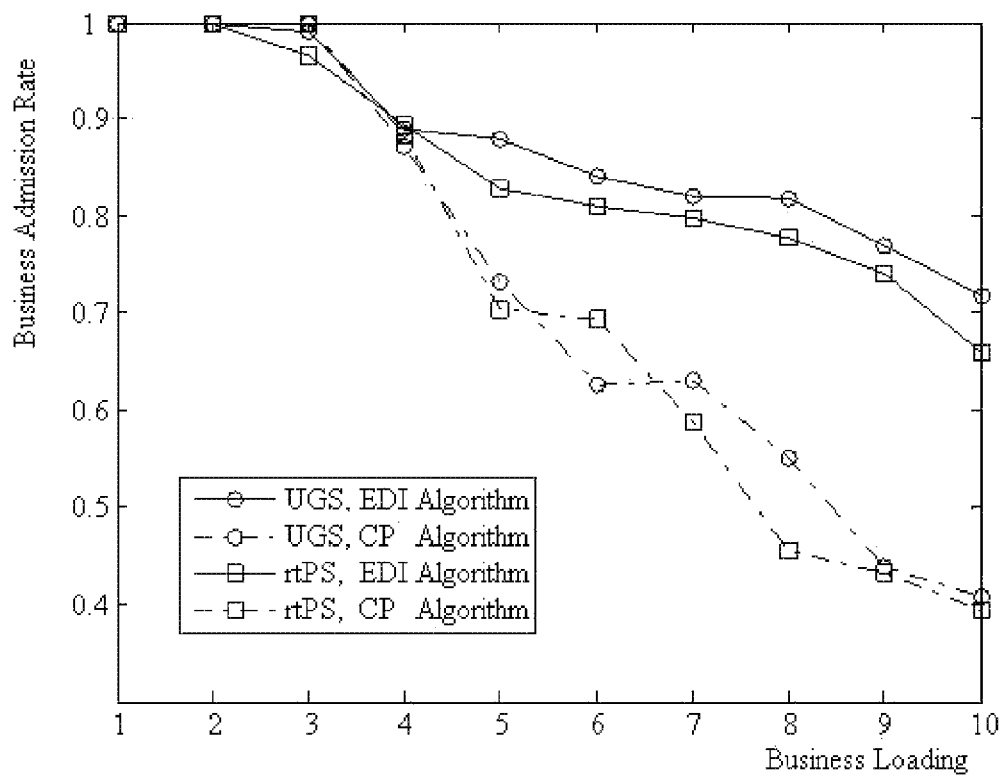
FIG. 4 is a second comparison chart showing the results of the simulation test to the call admission control method according to the above preferred embodiment of the present invention and the existing call admission control method using a guard channel strategy.
Figure 5:
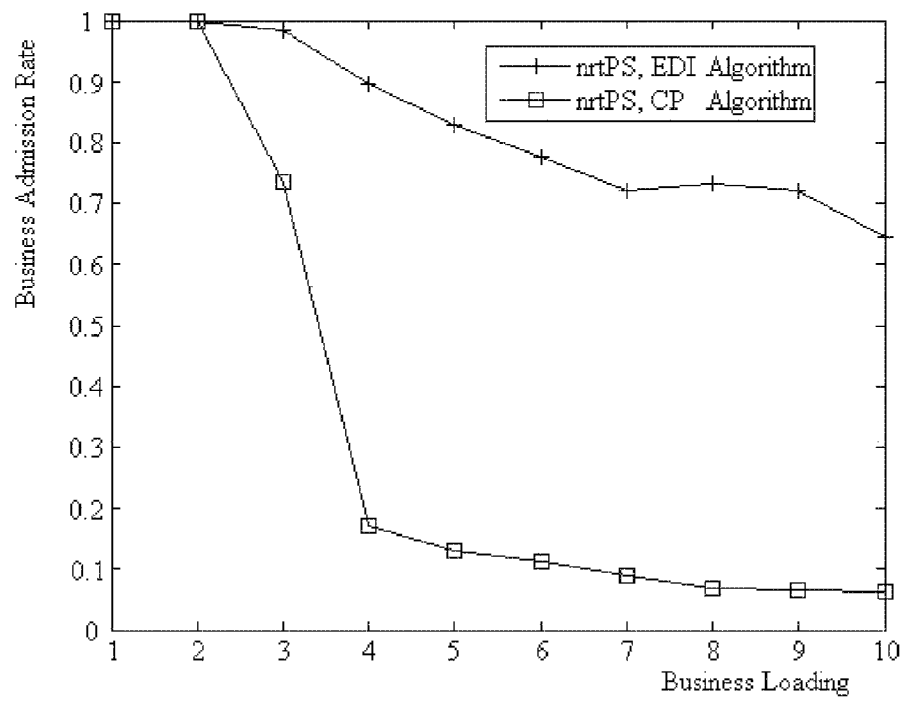
FIG. 5 is a third comparison chart showing the results of the simulation test to the call admission control method according to the above preferred embodiment of the present invention and the existing call admission control method using a guard channel strategy.
Figure 6:
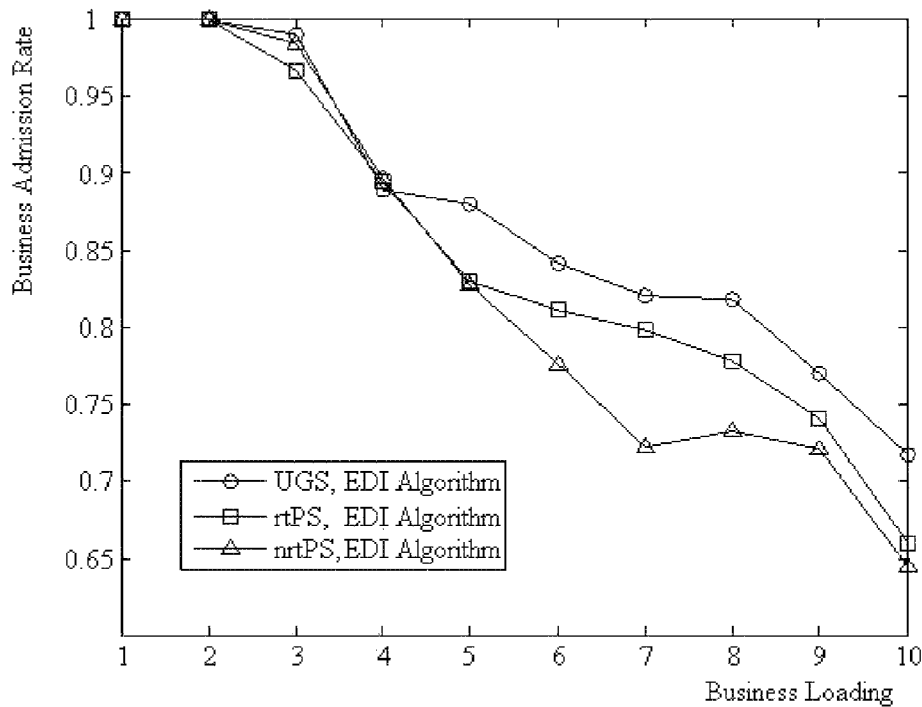
FIG. 6 is a fourth comparison chart showing the results of the simulation test to the call admission control method according to the above preferred embodiment of the present invention and the existing call admission control method using a guard channel strategy.

Referring to FIGS. 4 and 5, the admission ratios of the UGS, rtPS and nrtPS business flows of the CP algorithm under large load is much less than those of the EDI algorithm, respectively. This is because the CP algorithm has always been reserving the bandwidth for the new arrival business flow in accordance with the maximum bandwidth requirement thereof during the whole admission process, and when the total bandwidth of the admitted business flows exceeds the threshold $b_{th}$, only the real-time business flows (high priority businesses) will be admitted and the non-real-time business flows (low priority businesses) will be refused. The EDI algorithm, abiding by the principle of the equalization of the system income distribution, greatly improves the admission of the non-real-time business flows relative to the CP algorithm. Furthermore, when lack of the system resources, the EDI algorithm can admit more business flows by the bandwidth degradation, so that the admission rate of every kind of business will be significantly improved. Referring to FIG. 6, the little difference is provided between the admission ratio of the real-time business flows and that of the non-realtime business flows. This is because the EDI algorithm admits the business flows capable of narrowing the income gap at a higher rate, so as to ensure fairness. In the EDI model, the average income of the non-real-time business flows is the lowest. Therefore, to avoid enlarging the income gap, the EDI algorithm will limit the admission rate of the real-time business flows with high average income, and increase the admission rate of the non-real-time business flows. In addition, the non-real-time business flows has a wide adjustable bandwidth range, and can dynamically compresses the bandwidth thereof to serve for other business flows after admission, so it is worthwhile to improve the admission rate of the non-real-time business flows from the perspective of the income distribution fairness and the bandwidth utilization ratio.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A call admission control method, wherein an amount of currently admitted business flows of a WiMAX network is denoted by N, a sum of reserved maximum bandwidths with which a base station system provides the admitted business flows is denoted by $\Sigma b_{i,max}$, applied minimum and maximum bandwidths are denoted by $b_{N+1,min}, b_{N+1,max}$, respectively for a new arrival (N+1)th business flow, a bandwidth threshold of the base station system is denoted by $b_{th}$, and a total bandwidth that the base station system is capable of distributing to users is denoted by $b_{total}$, said method comprising the steps of:

(A) if $\Sigma b_{i,max} + b_{N+1,max} \leq b_{th}$, namely, base station system resources are idle, directly admitting a request of an (N+1)th business flow by the base station system;

(B) if $\Sigma b_{i,min} + b_{N+1,min} \geq b_{total}$, namely, base station system resources are seriously insufficient, directly refusing the request of the (N+1)th business flow by the base station system; and (C) if $\Sigma b_{i,max} + b_{N+1,max} \geq b_{th}$ and $\Sigma b_{i,min} + b_{N+1,min} \leq b_{total}$, namely, base station system resources are constrained, performing the following steps by the base station system of:

(C1) firstly, if $b_{th} \leq \Sigma b_{i,max} + b_{N+1,max} \leq b_{total}$, maintaining bandwidths of the currently admitted business flows of the WiMAX network by the base station system; if $\Sigma b_{i,max} + b_{N+1,max} \geq b_{total}$, reducing bandwidths of the currently admitted business flows of the WiMAX network to reserved maximum bandwidths of the currently admitted business flows by the base station system, respectively;

(C2) then, if the base station system refuses the (N+1)th business flow, obtaining a Gini coefficient, denoted by $G_{ongoing}$, by the base station system, where $G_{ongoing}$ is an obtained Gini coefficient when the base station system admits the N-th business flow; if the base station system admits the (N+1)th business flow, obtaining another Gini coefficient, denoted by $G_{new}$, by the base station system, wherein $G_{ongoing}$ and $G_{new}$ are determined by a following expression of $$G = \frac{2\mathrm{cov}(x_k, k)}{n\mu},$$

where $\mu$ is an average income of the admitted business flows, n is the number of the business flows admitted by the base station system, $x_k$ is an amount of incoming traffic of each of the business flows and the income relationship among the admitted business flows is arranged as $x_1 \leq x_2 \leq \ldots \leq x_n$, $\mathrm{cov}(x_k,k)$ is a covariance of $x_k$ and k, wherein while computing $G_{ongoing}$, k is in the range of [1,N], n is N, while computing $G_{new}$, k is in the range of [1,N+1], n is N+1, wherein $x_k$ is determined by a following expression of $x_k = w_k b_k$, where $w_k$ is a weight of every business flow determined by an expression of $w_k = e^{p_k}$, $b_k$ is a bandwidth of every business flow, and $p_k$ is a priority of every business flow;

(C3) then, comparing a relationship among $G_{ongoing}$, $G_{new}$ and a fair threshold and determining an admission rate by the base station system, where the admission rate is denoted by P, the fair threshold is denoted by $G_{th}$ in the range from 0 to 1, wherein if $G_{ongoing} > G_{th}$, then P is $P_1$ determined by a following expression based on Sigmoid function of $$P_1 = \begin{cases} 1 & G_{new} < G_{th} < G_{ongoing} \\ \dfrac{1}{1 + e^{(-a(G_{ongoing} - G_{new})/(G_{ongoing} - G_{th}) + b)}} & G_{th} \leq G_{new} \leq G_{ongoing} \\ 0 & G_{th} < G_{ongoing} < G_{new}; \end{cases}$$

if $G_{ongoing} \leq G_{th}$, then P is $P_2$ determined by a following expression based on Sigmoid function of $$P_2 = \begin{cases} 1 & G_{new} \leq G_{ongoing} \leq G_{th} \\ \dfrac{1}{1 + e^{(a(G_{new} - G_{ongoing})/(G_{th} - G_{ongoing}) - b)}} & G_{ongoing} < G_{new} \leq G_{th} \\ 0 & G_{ongoing} \leq G_{th} < G_{new}, \end{cases}$$

where a,b are coefficients of the expression, and make $P_1$ (while $G_{th} \leq G_{new} \leq G_{ongoing}$) always larger than $P_2$ (while $G_{ongoing} < G_{new} \leq G_{th}$); and (C4) after determining P, the base station system generating a random number between 0 and 1 via the random number generator obeying uniform distribution, denoted by $\alpha$, and choosing a bigger one from P and 1−P by comparing P with 1−P, and forming cumulative probability intervals of [0,max(P,1−P)] and [(max(P,1−P),1] together with 0 and 1, wherein when $\alpha \in$ [0, max(P,1−P)], if max(P,1−P)=P, then the request of the (N+1)th business flow will be admitted; if max(P,1−P)=1−P, then the request of the (N+1)th business flow will be refused; when $\alpha \in$ (max(P,1−P),1], if max(P,1−P)=P, then the request of the (N+1)th business flow will be refused, if max(P,1−P)=1−P, then the request of the (N+1)th business flow will be admitted.

* * * * *